US009031331B2

(12) United States Patent
Mensink et al.

(10) Patent No.: US 9,031,331 B2
(45) Date of Patent: May 12, 2015

(54) METRIC LEARNING FOR NEAREST CLASS MEAN CLASSIFIERS

(75) Inventors: Thomas Mensink, Grenoble (FR);
Jakob Verbeek, Grenoble (FR);
Gabriela Csurka, Crolles (FR); Florent Perronnin, Domene (FR)

(73) Assignee: Xerox Corporation, Norwalk, CT (US)

( * ) Notice: Subject to any disclaimer, the term of this patent is extended or adjusted under 35 U.S.C. 154(b) by 209 days.

(21) Appl. No.: 13/561,655

(22) Filed: Jul. 30, 2012

(65) Prior Publication Data

US 2014/0029839 A1 Jan. 30, 2014

(51) Int. Cl.
*G06K 9/62* (2006.01)
*G06K 9/00* (2006.01)

(52) U.S. Cl.
CPC .......... *G06K 9/00684* (2013.01); *G06K 9/6272* (2013.01); *G06K 9/6232* (2013.01)

(58) Field of Classification Search
CPC .. G06K 9/0028; G06K 9/62; G06F 17/30705; G06F 17/30707
USPC .......................................... 382/159, 224, 305
See application file for complete search history.

(56) References Cited

U.S. PATENT DOCUMENTS

| | | | | |
|---|---|---|---|---|
| 7,016,884 | B2 * | 3/2006 | Platt et al. ................. | 706/20 |
| 2008/0082468 | A1 * | 4/2008 | Long et al. ................. | 706/12 |
| 2010/0166276 | A1 * | 7/2010 | Dube et al. ................. | 382/131 |
| 2012/0143853 | A1 | 6/2012 | Gordo | |

OTHER PUBLICATIONS

U.S. Appl. No. 13/351,038, filed Jan. 16, 2012, Serrano.
U.S. Appl. No. 13/458,183, filed Apr. 27, 2012, Gordo, et al.
Deng, et al. "ImageNet: A large-scale hierarchical image database" CVPR 2009, pp. 1-8.
Checkik, et al. "Large scale online learning of image similarity through ranking", Journal of Machine Learning Research 11, 2010, pp. 1109-1135.
Deng, et al. "What does Classifying more than 10,000 image categories tell us?" ECCV 2010, Part V, LNCS 6315, pp. 71-84.
Vedaldi, et al. "Efficient Additive Kernels via Explicit Feature Maps", CVPR 2010, pp. 3539-3546.
Rohrbach, et al. "Evaluating Knowledge Transfer and zero-shot learning in large-scale setting", CVPR 2011, pp. 1641-1648.
Jegou, et al. "Product quantization for nearest neighbor search", IEEE Trans PAMI 33, 2011, pp. 117-128.
Perronnin, et al. "Large-scale image categorization with explicit data embedding", CVPR 2010, pp. 2297-2304.

(Continued)

*Primary Examiner* — John Strege
(74) *Attorney, Agent, or Firm* — Fay Sharpe LLP

(57) ABSTRACT

A classification system and method enable improvements to classification with nearest class mean classifiers by computing a comparison measure between a multidimensional representation of a new sample and a respective multidimensional class representation embedded into a space of lower dimensionality than that of the multidimensional representations. The embedding is performed with a projection that has been learned on labeled samples to optimize classification with respect to multidimensional class representations for classes which may be the same or different from those used subsequently for classification. Each multidimensional class representation is computed as a function of a set of multidimensional representations of labeled samples, each labeled with the respective class. A class is assigned to the new sample based on the computed comparison measures.

27 Claims, 6 Drawing Sheets

(56) References Cited

OTHER PUBLICATIONS

Weston, et al. "WSABIE: Scaling up to large vocabulary image annotation", IJCAI 2011, pp. 2764-2770.
Sanchez, et al. "High dimensional signature compression for large-scale image classification", CVPR 2011, pp. 1665-1672.
Jegou, et al. "Aggregating local image descriptors into compact codes", IEEE Trans Pattern Analysis and Machine Intelligence, 2011, pp. 117-128.
Lin, et al. "Large-scale image classification: fast feature extraction and SVM training", CVPR 2011, pp. 1689-1696.
Guillaumin, et al. "TagProp: Discriminative Metric learning in nearest neighbor models for image auto-annotation", ICCV 2009, pp. 309-316.
Veenman, et al. "Less: a model-based classifier for sparse subspaces", IEEE Trans on PAMI, 2005, vol. 27, No. 9, pp. 1496-1500.
Zhou, et al. "SIFT-Bag Kernel for Video Event Analysis", 16th ACM Int'l Conf. on Multimedia (MM'08), pp. 229-238, 2008.
Weinberger, et al. "Distance metric learning for large margin nearest neighbor classification", Advances in Neural Information Processing Systems (NIPS) 2006, pp. 1473-1480.
Bottou, L. "Large-scale machine learning with stochastic gradient descent", COMPSTAT'2010, pp. 177-187.
Gray, et al. "Quantization", IEEE Trans. Information Theory, 1998, vol. 44, No. 6, pp. 2325-2383.
Perronnin, et al. "Improving the Fisher Kernel for Large-scale image classification", ECCV 2010, pp. 143-156.
Zhang, et al. "Local features and kernels for classification of texture and object categories: a comprehensive study" IJCV 73, 2 (2007), pp. 213-238.
Nowak, et al. "Learning visual similarity measures for comparing never seen objects", CVPR 2007, pp. 1-8.
Chai, et al. "Large margin nearest local mean classifier", Signal Processing 90 (2010), pp. 236-248.
Fei-Fei, et al. "One-shot learning of object categories" IEEE Trans. PAMI 28:4 (2006), pp. 594-611.
Lampert, et al. "Learning to detect unseen object classes by between-class attribute transfer", CVPR 2009, pp. 1-8.
Tommasi, et al. "The more you know, the less you learn: from knowledge transfer to one-shot learning of object categories" British Machine Vision Conference (BMVC) 2009, pp. 1-11.
Larochelle, et al. "Zero-data learning of new tasks", AAAI Conf. on Artificial Intelligence, 2008, pp. 646-651.
Gauvain, et al. "Maximum a posteriori estimation for multivariate Gaussian Mixture Observations of Markov Chains", IEEE Trans. on Speech and Audio Proc. 2, (1994), pp. 291-298.
Guillaumin, et al. "Is that you? Metric Learning approaches for face identification" ICCV 2009, pp. 1-8.

\* cited by examiner

METRIC LEARNING FOR NEAREST CLASS MEAN CLASSIFIERS

BACKGROUND

The exemplary embodiment relates to learning classifiers and finds particular application in the classification of samples such as images which allows new data (samples or classes) to be added at low cost.

There has been a substantial increase recently in the number of digital items that are available, such as single images and videos. These exist, for example, in broadcasting archives and social media sharing websites. Only a small fraction of these items is consistently annotated with labels which represent the content of the item, such as the objects which are recognizable within an image. Accordingly, scalable methods are desired for annotation and retrieval to enable efficient access to this large volume of data. One dataset (see, Deng, et al., "ImageNet: A large-scale hierarchical image database." in CVPR (2009)), which contains more than 14 million images manually labeled according to 22,000 classes, has provided a valuable benchmark tool for evaluating large-scale image classification and annotation methods.

In large-scale image annotation, for example, the goal is to assign automatically a set of relevant labels to an image, such as names of objects appearing in the image, from a predefined set of labels. The general approach is to treat the assignment as a classification problem, where each label may be associated with a respective classifier which outputs a probability for the class label, given a representation of the image, such as a multidimensional vector. To ensure scalability, linear classifiers such as linear support vector machines (SVMs) are often used, sometimes in combination with dimension reduction techniques which reduce the dimensionality of the input multidimensional vector, to speed-up the classification. Systems have been developed which are able to label images with labels corresponding to 10,000 or more classes (see, for example, Deng, J., et al., "What does classifying more than 10,000 image categories tell us?" in ECCV (2010), hereinafter, "Deng 2010"; Weston, J., et al., "Scaling up to large vocabulary image annotation," in IJCAI (2011) hereinafter, "Weston"; and Sánchez, J., et al., "High-dimensional signature compression for large-scale image classification," in CVPR (2011)).

A drawback of these methods, however, is that when images of new categories (classes) become available, new classifiers have to be trained at a relatively high computational cost. Many real-life large-scale datasets are open-ended and dynamic. This means that new potential classes appear over time and new photos/videos continuously appear, which are to be added to existing or new classes.

One method which has been adapted to large scale classification is referred to as k-nearest neighbor (k-NN) classification. In this approach, each image in a database is represented by a multidimensional feature vector and labeled with one (or more) of a set of classes. When a new image to be labeled is presented, a representation is computed. The image representation is compared with the representations of the images in the database using a suitable distance measure, to identify the nearest images, i.e., the k-NN, where k can be a suitable number such as 1, 5, or 10. The labels of the retrieved images are used to assign a class label (or probabilistic assignment of labels) to the new image. This highly non-linear and non-parametric classifier has shown good performance for image annotation, when compared with SVMs (see, Deng 2010; Weston; and Guillaumin, M, et al. "Tagprop: Discriminative metric learning in nearest neighbor models for image auto-annotation," in ICCV (2009)).

One disadvantage of the k-NN method is that the search for nearest neighbors for classification of the new image is computationally demanding for large and high-dimensional datasets. Each time a new image is received, its representation has to be compared with all the image representations in the database. While methods may be employed which limit the search to only a subset of the images, this tends to reduce the performance of the method.

Another approach for addressing the classification of evolving datasets is the Nearest Class Mean (NCM) classifier. In this approach, each class is represented by its mean feature vector, i.e., the mean of all the feature vectors of the images in the database that are labeled with that class (see, Webb, A., "Statistical Pattern Recognition," Wiley (2002); Veenman, C., et al. "LESS: a model-based classifier for sparse subspaces. IEEE Trans. PAMI 27, pp. 1496-1500 (2005); and Zhou, X., et al., "Sift-bag kernel for video event analysis," in ACM Multimedia (2008)). When a new image is to be labeled, its own representative feature vector is compared with the mean feature vectors of each of the classes using a suitable distance measure. The label or labels assigned to the image are based on the computed distances. The cost of computing the mean for each class is low, with respect to the cost of feature extraction, and this operation does not require accessing images of other classes. In contrast to the k-NN classifier, the NCM classifier is a linear classifier which leads to efficient classification.

One disadvantage of this method is that the complete distribution of the training data of a class is characterized only by its mean. In practice, the performance of such classifiers on large datasets tends to be low.

Aspects of the exemplary method provide a system and method of learning and applying a classifier for labeling images and other samples, which is well suited to large and evolving datasets while being computationally efficient.

INCORPORATION BY REFERENCE

The following references, the disclosures of which are incorporated herein by reference, in their entireties, are mentioned.

U.S. application Ser. No. 12/960,018, filed on Dec. 3, 2010, entitled LARGE-SCALE ASYMMETRIC COMPARISON COMPUTATION FOR BINARY EMBEDDINGS, by Albert Gordo, et al.

U.S. application Ser. No. 13/351,038, filed on Jan. 16, 2012, entitled IMAGE SEGMENTATION BASED ON APPROXIMATION OF SEGMENTATION SIMILARITY, by José Antonio Rodriguez Serrano.

U.S. application Ser. No. 13/458,183, filed on Apr. 27, 2012, entitled RETRIEVAL SYSTEM AND METHOD LEVERAGING CATEGORY-LEVEL LABELS, by Albert Gordo, et al.

BRIEF DESCRIPTION

In accordance with one aspect of the exemplary embodiment, a classification method includes, for a new sample to be classified, and for each of a set of classes, computing a comparison measure between a multidimensional representation of the new sample and a respective multidimensional class representation. The comparison measure is computed in a space of lower dimensionality than the multidimensional representation of the new sample by embedding the multidimensional representation of the new sample and the multidimensional class representations with a projection that has been learned on labeled samples to optimize classification based on the comparison measure. Each multidimensional class representation is computed based on a set of multidimensional representations of labeled samples labeled with the respective class. A class is assigned to the new sample based on the computed comparison measures.

One or more of the steps of the method may be performed with a computer processor.

In accordance with another aspect of the exemplary embodiment, a system includes memory which stores a projection matrix for embedding multidimensional representations into an embedding space, the projection matrix having been learned from class-labeled samples to optimize a classification rate on the labeled samples with a set of nearest class mean classifiers. The system includes, for each of a set of classes, a nearest class mean classifier, each of the nearest class mean classifiers being computed based on multidimensional representations of samples labeled with the respective class. Instructions are provided for computing a comparison measure between a multidimensional representation of new sample and each of the nearest class mean classifiers. The comparison measure is computed in the embedding space in which the multidimensional representation of the new sample and the nearest class mean classifiers are embedded with the projection matrix. Information is output based on the comparison measure. A processor in communication with the memory implements the instructions.

In another aspect, a method of generating a classification system includes providing a multidimensional representation and a class label for each of a set of training samples. Each of the class labels corresponds to a respective one of a set of classes. A nearest class mean classifier is computed for each of the classes, based on the multidimensional representations of training samples labeled with that class. A projection is learnt, based on the multidimensional representations, class labels, and nearest class mean classifiers, which embeds the multidimensional representations and nearest class mean classifiers into an embedding space that optimizes a classification of the training samples by the set of nearest class mean classifiers in the embedding space. The projection is stored for embedding a new sample into the embedding space. One or more of the steps of the method may be performed with a computer processor.

DETAILED DESCRIPTION

Aspects of the exemplary embodiment relate to a system and method for large-scale classification of samples, such as images, which is especially applicable to settings where samples corresponding to new or existing classes are continuously added to a training set.

The exemplary system employs a classifier which can incorporate such samples and classes on-the-fly at low computational cost. The exemplary system and method rely on a metric learning phase in which a linear projection of the data is learned such that samples to be labeled are embedded in a space in which a nearest class mean (NCM) classifier is optimal. The learned projection can be shared across all classes, both existing classes used in training the classifier and new classes generated thereafter. In the learning and classification phases, a suitable comparison measure, such as a distance metric, such as the $l_2$ distance, is used after projection. The projection may be learned with a gradient descent method, such as stochastic gradient descent. This can be combined with product quantization compression of image representations.

In various aspects, the metric learning algorithm is based on the minimization of multi-class classification logistic loss; however other losses are also contemplated, such as the hinge loss or a ranking loss. In these approaches, a requirement is enforced that a sample from a given class is to be closer to its class mean than to any other class mean in the projected space. To apply these metric learning techniques on large-scale datasets, stochastic gradient descent (SGD) algorithms are employed, which access only a small fraction of the training data at each iteration. To facilitate metric learning on high-dimensional image features of large scale datasets that are too large to fit in memory, in addition, product quantization may be used, which is a data compression technique that has been applied to large-scale image retrieval.

In the following, the terms "optimization," "minimization," and similar phraseology are to be broadly construed as one of ordinary skill in the art would understand these terms. For example, these terms are not to be construed as being limited to the absolute global optimum value, absolute global minimum, and so forth. For example, minimization of a function may employ an iterative minimization algorithm that terminates at a stopping criterion before an absolute minimum is reached. It is also contemplated for the optimum or minimum value to be a local optimum or local minimum value.

Figure 1:
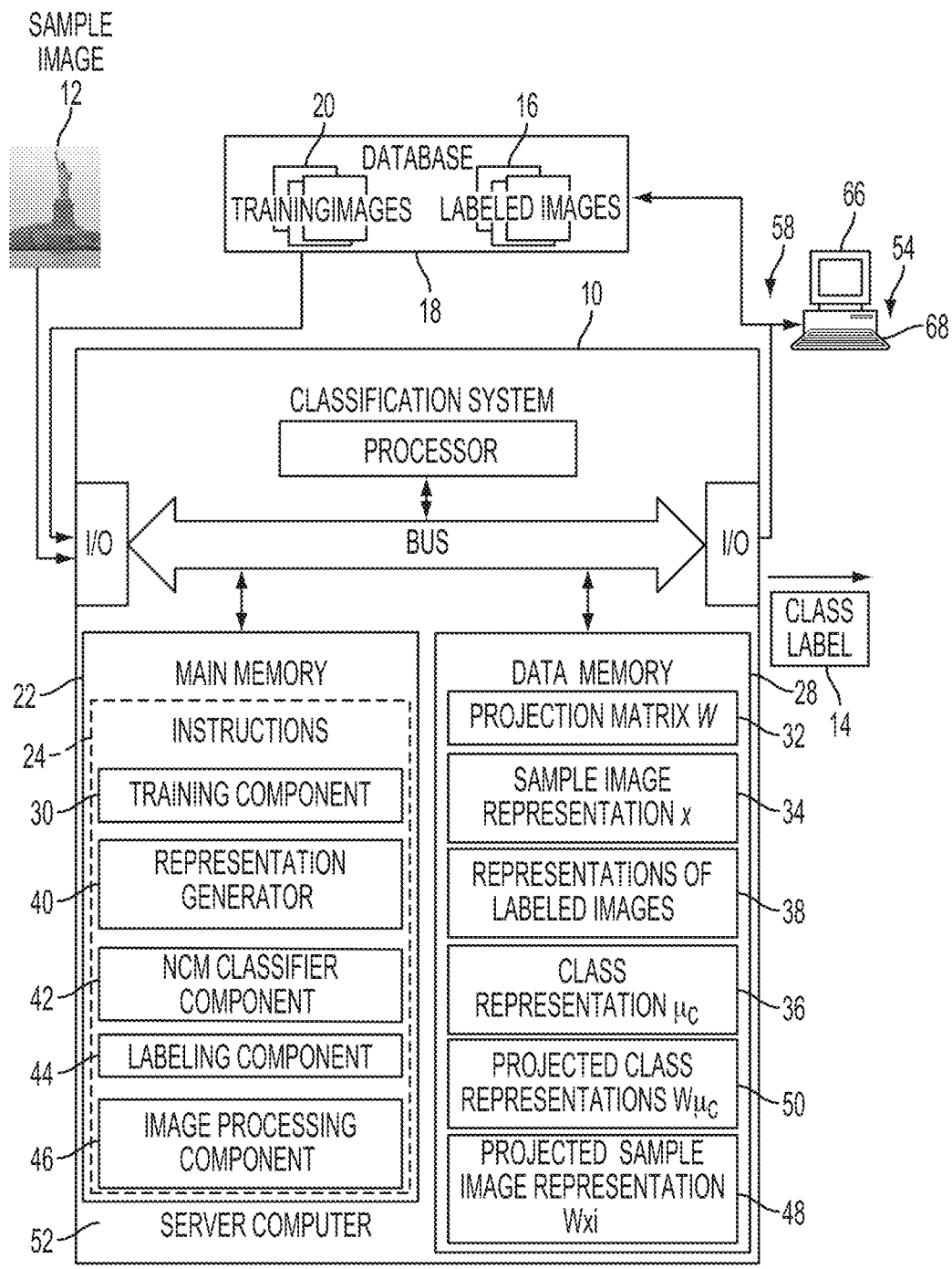
FIG. 1 is a functional block diagram of a system for classification of samples such as image signatures in accordance with one aspect of the exemplary embodiment.

With reference to FIG. 1, an exemplary image classification system 10 is illustrated in an operating environment. The system takes as input a sample 12 to be classified. The system 10 assigns a class label 14 or labels probabilistically to the sample 12, based on labels of samples 16 stored in a database 18 which contains a large collection of labeled (classified) samples. The exemplary samples are images and will be described as such. By way of example, the image 12 may depict an object, such as a physical object, scene, landmark, or document. The system 10 is trained using a labeled set of training images 20. This allows dimensionality reduction for the image 12 and labeled images 20 to be learned in a supervised manner. The training images 20 may be drawn from the set of labeled images 16, e.g., may be an initial set of the labeled images 16, to which new labeled images are subsequently added at intervals, such as sample image 12, when it has been labeled.

The system 10 includes main memory 22, which stores instructions 24 for performing the exemplary method, and a computer processor 26 communicatively linked to the memory 22, for executing the instructions. Data memory 28 receives and stores the sample image 12 during processing.

The instructions 24 include a training component 30 for metric learning. In particular, the training component learns a projection 32, such as a d×D matrix W, which allows a distance to be computed between representations 34, 36 which are embedded in a d dimensional space. The representations 34, 36 to be compared can each be a D dimensional vector, the first vector 34 representing the sample image 12 to be classified and the second vector 36 representing a class c of images. In one embodiment, the second vector 36 can be a single Nearest Class Mean (NCM) classifier for the class. The class representation 36 may be a function, such as the average (e.g., mean), of the set of D dimensional vectors 38 of the images 16 currently in the database 18 that are labeled with the corresponding class label (or at least a representative sample thereof). The mean of a set of multidimensional vectors can be computed by averaging, for each index (dimension), the values of the vectors for that index.

In general, d<D, for example d≤0.5 D, or d≤0.3 D, or d≤0.1 D. However, it is to be appreciated that d could be equal to or larger than D. As will be appreciated, if d=1, the projection matrix 32 is a vector, however, in general, d>1. d can be, for example, at least 5 or at least 10, and can be up to 10,000, such as at least 30, or at least 100, and in some embodiments, less than 2000, or about 1000, or less. D can be, for example, from about 1000-1,000,000, e.g., at least 2000 or at least 4000, and in some embodiments, at least 10,000. Learning of the projection matrix 32 is described below.

In another embodiment, the class representation 36 can be a set of k (k≥1, e.g., k>1, i.e., two or more) vectors, each vector corresponding to a respective cluster center (centroid) for that class, where each centroid can be considered as a Nearest Class Mean (NCM) classifier for a subset of the images in the class, and where the two or more subsets of images can be generated by clustering images labeled with that class.

A representation generator 40 generates the multidimensional representations 34, 38, etc. of the images 12, 16, 18, based on features extracted from the images, as described in further detail below.

An NCM classifier component 42 predicts a class label 14 for the image 12 by computing a distance to respective class representations 36 of each of a set of classes where the distance is computed between the projected representations, i.e., between the d dimensional vectors generated by applying the learned projection matrix W to the D dimensional representations 34, 36. The classifier component 42 can apply a classification function, which may be a decreasing function of the computed distance, to compute a probability that the image should be labeled with a given class. For example, the classifier component 42 can be formulated using multi-class logistic regression. The projection of the representations 34, 36 and distance computation can be performed jointly using a distance computation function which applies the learned projection 32.

Linear Classification using a Single Class Mean per Class

In one embodiment, the probability for a class c given an image feature vector x can then be defined as:

$$p(c \mid x) = \frac{\exp - d_W(\mu_c, x)}{\sum_{c'=1}^{C} \exp - d_W(\mu_{c'}, x)} \quad (1)$$

where $\mu_c$ is the class representation 36 (NCM classifier) derived from all (or at least a portion) of the representations 38 for the images currently in class c∈{1, ..., C}, such as the mean of the feature vectors $x_i$ 38 from class c∈{1, ..., C}., x is the representation 34 of image 12, $d_W(\mu_c, x)$ represents the distance measure between the projected representations $\mu_c$ and x. In the exemplary embodiment, it is the norm of $\mu_c$−x, such as the $l_2$ distance (Euclidian distance), when each of $\mu_c$ and x is projected by the projection matrix W (32), W∈ℝ$^{d\times D}$. This can be written as $d_W(\mu_c, x) = \|W\mu_c - Wx\|^2$, the denominator $\sum_{c'=1}^{C} \exp-d_W(\mu_{c'}, x)$ is a normalizing factor over all classes C so that the posterior probabilities p(c|x) for all classes sum to 1.

It should be noted that when the distance measure is the $l_2$ distance:

$$d_W(\mu_c, x) = \|W\mu_c - Wx\|^2 = (\mu_c - x)^T W^T W(\mu_c - x) \quad (2)$$

where T represents the transpose.

This allows p(c|x) to be readily computed by matrix multiplication.

The definition in Eqn. (1) may also be interpreted as giving the posterior probabilities of a generative model, such as a Gaussian mixture model, where the Gaussian means are the $\mu_c$'s (one for each class), and the class-independent covariance matrix Σ is set such that Σ=WW. The class probabilities p(c) are set to be uniform over all classes.

As will be appreciated, the exponential exp in Eqn. (1) can be replaced by another suitable decreasing function whereby p decreases as the distance (in the d dimensional space) between $\mu_c$ and x increases, such as a linearly decreasing function.

Similarly, the $l_2$ distance can be replaced by another suitable norm which outputs a scalar value as the comparison measure such as the Manhattan distance.

The NCM classifier component 42 can output class probabilities based on (e.g., equal to) the values p(c|x) according to Eqn. (1), for each class in C, or for at least a subset of the classes, such as those which exceed a predetermined threshold probability p. In another embodiment, the classifier component 42 outputs the single most probable class c* (or a subset N of the most probable classes, where N<C). For example, an image x can be assigned to the class c* with the minimum distance to x, e.g., as follows:

$$c^* = \overset{argmin}{c} \{\|x - \mu_c\|_W^2\} = \overset{argmin}{c} \{\|W\mu_c\|^2 - 2\mu_c^T(W^T W)x\} \quad (3)$$

where T represents the transpose and $d_W(\mu_c, x)$ is represented by $\|x-\mu_c\|_W^2$, the $l_2$ norm of the distance between the projected values of x and $\mu_c$.

To obtain the second part of Eqn. 3, it may be noted that:
$(x-\mu_c)^T W^T W(x-\mu_c) = x^T W^T W x + \mu_c^T W^T W \mu_c - 2\mu_c^T W^T W x$ The $\mu_c^T W^T W \mu_c$ part is then denoted $\|W\mu_c\|^2$ in Eqn. 3, (which is the $l_2$ norm after projection), and the class independent part $x^T W^T W x$ is omitted. $\|W\mu_c\|^2$ is thus the squared norm of the product of the projection matrix and the mean representation of the class.

It may also be noted that this means the NCM classifier component 42 is linear in x allowing ease of testing.

A labeling component 44 assigns a label 14 to the sample 12, based on the classifier output. This can be the most probable class or classes, or a probabilistic assignment over all classes. In some cases, no class label is applied, for example, if there is no class for which the probability p exceeds a predefined threshold. The label, or information based thereon, may be output from the system. In some embodiments, a processing component 46 processes the image, based on the assigned label.

The system 10 allows new classes to be added to the set C of classes, without needing to relearn the projection W. The class representation 36 (e.g., mean) $\mu_c$ for the new class is simply computed from the representations of the images that are labeled with the new class. Additionally, new samples can be added to a preexisting class and the class mean 36 recomputed to reflect the representations 38 of the new sample(s). The method is effective even when a hundred or a thousand new images, or more are added to the class. As will be appreciated, the projection matrix W can be relearned periodically to take advantage of labeled images newly added to the database 16.

Unlike conventional transfer learning methods, in which information is shared across classes during learning, the present method is applicable to classes which have not been seen in the training phase. Here, however, transfer learning involves only a small amount of processing on the data of new classes (averaging to get the class mean representation), and relies on the metric that was trained on other classes to recognize the new ones. In contrast to most transfer learning methods, the method does not require intermediate representation in terms of parts or attributes, nor is it necessary to train classifiers for the new classes.

The training component 30 learns the projection matrix W using the representations of the set of labeled training samples 20. The learning optimizes the performance of the classifier component 42 by identifying a projection matrix W that maximizes over all samples 20, the likelihood that a sample will be classified with its actual (ground truth) label. In the exemplary embodiment, this can be expressed as a minimization of the negative log-likelihood of the ground-truth class labels $y_i \in \{1, \ldots, C\}$ of the training images:

$$\mathcal{L} = -\frac{1}{N}\sum_{i=1}^{N} \ln p(y_i \mid x_i) \quad (4)$$

where N is the number of training samples, and $p(y_i|x_i)$ is the probability of observing the correct label $y_i$ for an image $x_i$.

The goal of the training is to find the projection matrix W that minimizes the loss function $\mathcal{L}$. To compute the projection matrix W that minimizes this function over a large training set is computationally expensive or intractable. Accordingly, minimization can be achieved by using an iterative process, such as a gradient descent learning method. For example stochastic gradient descent (SGD) can be applied. See, for example, Léon Bottou, "Stochastic learning," in *Advanced Lectures on Machine Learning*, Lecture Notes in Artificial Intelligence, LNAI 3176, pp. 146-168 (Olivier Bousquet and Ulrike von Luxburg, Eds., Springer Verlag, Berlin, 2004).

Rather than attempting to optimize the loss function of Eqn. (4) over all possible training samples in the database simultaneously, the stochastic gradient descent method takes a subset m of the samples and determines whether the current projection matrix applied to Eqn. (1) labels them correctly according to their ground truth, i.e., with their actual (correct) labels, and otherwise updates the projection matrix W.

The gradient of the objective function shown in Eqn. (4) can be shown to have the form:

$$\nabla_W \mathcal{L} = \frac{2}{N}\sum_{i=1}^{N}\sum_{c=1}^{C}([\![y_i = c]\!] - p(c \mid x))W(\mu_c - x_i)(\mu_c - x_i)^T \quad (5)$$

where $[\![y_i = c]\!]$ denotes 1 if its argument is true, and 0 otherwise.

To learn the projection matrix W with SGD, a number of iterations are performed. At each iteration, a fixed number m of training images is used to estimate the gradient. In this step, a sample from a given class is enforced to be closer to its class mean than to any other class mean in the projected space.

The projection matrix W to be learned is initialized with a set of values. These can be quite arbitrary. For example, the initial values in the matrix are drawn at random from a normalized distribution with a mean of 0, i.e., the values sum to 0. In other embodiments, the initial values are all the same, or are drawn from a projection matrix previously created for another classification task.

SGD allows for faster training on large datasets, since it only uses a fraction of the dataset for each gradient estimation. At each iteration, for example, about 1,000 images are sampled uniformly at random over all classes. The update rule for the projection matrix using stochastic gradient descent can be a function of the prior projection matrix at time t and a learning rate, for example, as follows:

$$W_{t+1} = W_t - \lambda \nabla_W \log l_t$$

where $\log l_t$ denotes the log likelihood over the samples in iteration t, and $\lambda$ is a constant or decreasing learning rate that controls the strength of the update. If $\lambda$ is large, then W is updated more rapidly but the iterations may result in rather wild fluctuations. In one exemplary embodiment, $\lambda$ is a constant and has a value of less than 0.1, such as about 0.01. This updates each of the values in the projection by a small amount as a function of the learning rate.

In the exemplary method, a fixed learning rate is used and it is not necessary to include an explicit regularization term, but rather the projection dimension d≤D, as well as the number of iterations, can be used as an implicit form of regularization. The performance can be evaluated on a validation set to validate the parameters selected. Several projection matrices can be learned, with different values of d, and tested on the validation set to identify a suitable value of d which provides acceptable performance without entailing too high of a computational cost at labeling time.

Once the projection matrix W (32) has been learned, it can be stored in memory 28 or output to another computing device for use in labeling images. In some embodiments, projections of the class means ($W\mu_c$) may be precomputed and stored, as shown at 50, to reduce computation time during labeling by the classifier component 42.

Non-Linear Classification Using Multiple Centroids Per Class

In another embodiment, the NCM classifier is extended to allow for more flexible class representations and non-linear classification, by using multiple centroids per class. Assume for each class, a set $\mathcal{M}_c$ of centroids, is obtained, each set consisting of k centroids, each centroid represented by a vector $m_{cj}$. Then the posterior probability for class c for an image i can be defined as:

$$p(c \mid x_i) = \sum_{j \in M_c} p(j \mid x_i) = \frac{1}{Z} \sum_{j \in M_c} \exp(-d_W(x_i, m_{cj})), \quad (6)$$

where Z denotes a normalizer, e.g., $$Z = \sum_c \sum_{j \in M_c} \exp(-d_W(x, m_{cj})) \quad (7)$$

This NCM classifier may be referred to as the Nearest Class Multiple Centroids (NCMC) classifier. The NCMC classifier replaces the class means in Eqn (1) with a number k ($=\mathcal{M}_c$) of centroids per class. The probability of assigning a class c to a feature vector $x_i$ is thus an exponentially decreasing function of the distance between the projected feature vector $x_i$ and each projected centroid, aggregated (e.g., summed) over all centroids for that class, and optionally normalized with a normalizing factor Z. A similar assignment to that used in Eqn. 3 may be computed in which an image x can be assigned to the class c* with the minimum distance to x.

This model also corresponds to a generative model, in this case the probability for an image feature vector $x_i$, to be generated by a class c, is given by a mixture of $\mathcal{M}_c$ Gaussians with equal mixing weights:

$$p(x_i \mid c) = \frac{1}{|\mathcal{M}_c|} \sum_{j \in M_c} \mathcal{N}(x_i, m_{cj}, \Sigma) \quad (8)$$

$\mathcal{N}$ denotes a normal (i.e., Gaussian) distribution and $\mathcal{N}(x_i, m_{cj}, \Sigma)$ denotes the likelihood of sample $x_i$ on the Gaussian which has mean $m_{cj}$ and covariance matrix $\Sigma$. In this case, the covariance matrix $\Sigma$ can be shared among all classes.

The k ($\mathcal{M}_c$) class centroids $m_{cj}$ for the class can be obtained by applying a clustering algorithm, such as a k-means clustering algorithm to the image features $x_i$ for all images i from class c. For the clustering step, the image feature vectors without projection with matrix W may be used. As will be appreciated, by setting k=1 for all classes, the NCM classifier described in Eqn. (1) above is obtained. On the other hand, in the limit that each image in the set were to be used as a class centroid, a formulation comparable to a k-NN classifier would be obtained. To leverage the advantages of the NCM classifier, the value of k (i.e., $\mathcal{M}_c$ for each class) is less than the (average) number of images in each class and may be relatively small such as less than 10% of the number of images in the class, or may be up to 50, or up to 30, e.g., 15, or 10, or 5. The value of k can be the same for each class or may be different (e.g., within a prescribed range of, for example, from 1-30 or 1-20, such as at least 2 or at least 5 for each of at least a plurality of the classes). The NCMC classifier thus replaces the single class mean with a plurality of centroids (for at least one of the classes). Each centroid can be the mean of the feature vectors of the images assigned to that cluster.

The projection matrix W can be obtained in a similar manner to that described above in Eqns. (4) and (5). For example, given a set of class centroids, the projection matrix W can be learned by minimizing the negative log-likelihood, as for the NCM classifier. The derivative w.r.t. W becomes:

$$\nabla_W = \sum_i \sum_c \sum_{j \in M_c} [p(j \mid x_i) - p(j \mid x_i, y_i)] W(m_{cj} - x_i)^T \quad (9)$$

and $$p(j \mid x_i, y_i) = \begin{cases} \dfrac{p(j \mid x_i)}{\sum_{j \in M_c} p(j' \mid x_i)} & \text{if } j \in M_{y_i}, \\ 0 & \text{otherwise.} \end{cases} \quad (10)$$

In another embodiment, it may be advantageous to iterate the clustering to obtain the class means $m_{cj}$ and the learning the projection matrix W. In this method, the samples in a class are first clustered then a first projection matrix is learned on these clusters. For each subsequent iteration, such as for 1, 2, 3 or more iterations, the projection matrix is used to eliminate class means which are redundant or to combine clusters. For the remaining clusters, the samples in those clusters are reclustered and a new projection matrix is learned. Such a method allows the class means to represent the distribution of the images in the projected space more precisely, and replacing class means which become redundant after projection. Therefore, such an iterative approach may improve the performance, but may be computationally expensive.

The computer-implemented classification system 10 may include one or more computing devices 52, such as a PC, such as a desktop, a laptop, palmtop computer, portable digital assistant (PDA), a server computer, cellular telephone, tablet computer, pager, combination thereof, or other computing device capable of executing instructions for performing the exemplary method. For example, the labeling may be performed on a server computer 10 and the labels output to a linked client device 54, or added to the database 18, which may be accessible to the system 10 and/or client device 54, via wired or wireless links 56, 58, such a local area network or a wide area network, such as the Internet. The computer system 10 includes one or more input/output interfaces (I/O) 60, 62 for communicating with external devices, such as client device 52 and/or database 18. Hardware components of the system may communicate via a data/control bus 64.

The memory 22, 28 may be separate or combined and may represent any type of non-transitory computer readable medium such as random access memory (RAM), read only memory (ROM), magnetic disk or tape, optical disk, flash memory, or holographic memory. In one embodiment, the memory 22, 28 comprises a combination of random access memory and read only memory. In some embodiments, the processor 26 and memory 22 may be combined in a single chip.

The digital processor 26 can be variously embodied, such as by a single-core processor, a dual-core processor (or more generally by a multiple-core processor), a digital processor and cooperating math coprocessor, a digital controller, or the like. The exemplary digital processor 26, in addition to controlling the operation of the computer system 10, executes the instructions 24 stored in memory 22 for performing the method outlined in FIG. 2.

The interface 60 is configured for receiving the sample image 12 (or a pre-computed representation 34 thereof) and may include a modem linked to a wired or wireless network, a portable memory receiving component, such as a USB port, disk drive, or the like. The interface 62 may communicate with one or more of a display 66, for displaying information to users, such as images 12, labels 14, and/or a user input device 68, such as a keyboard or touch or writable screen, and/or a cursor control device, such as mouse, trackball, or the like, for inputting text and for communicating user input information and command selections to the processor 26. In some embodiments, the display 66 and user input device 68 may form a part of a client computing device 54 which is communicatively linked to the retrieval system computer 52 by a wired or wireless link, such as a local area network or wide area network, such as the Internet.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 2A:
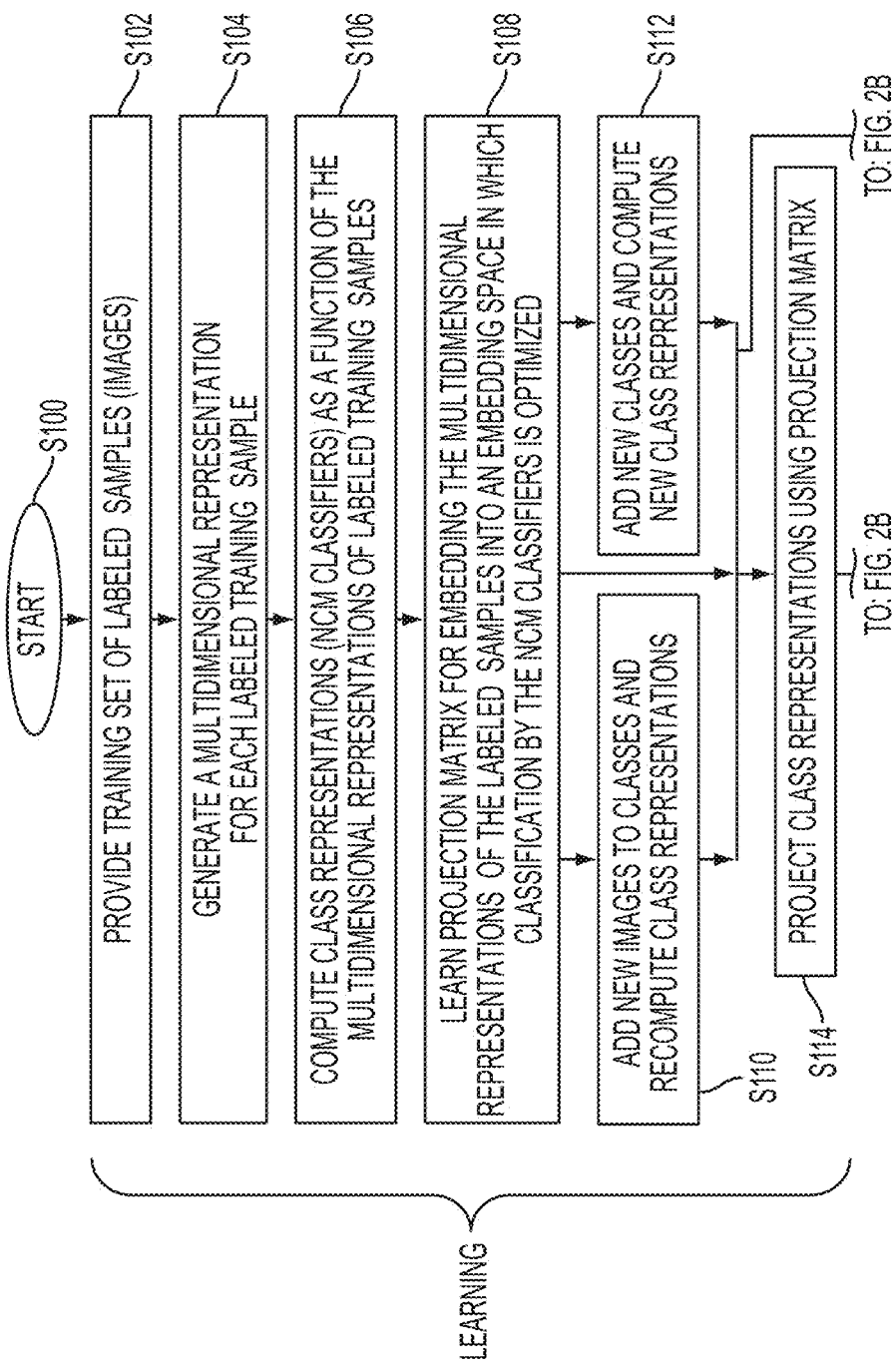
FIG. 2 is a flow chart illustrating a classification method in accordance with another aspect of the exemplary embodiment.
Figure 2B:
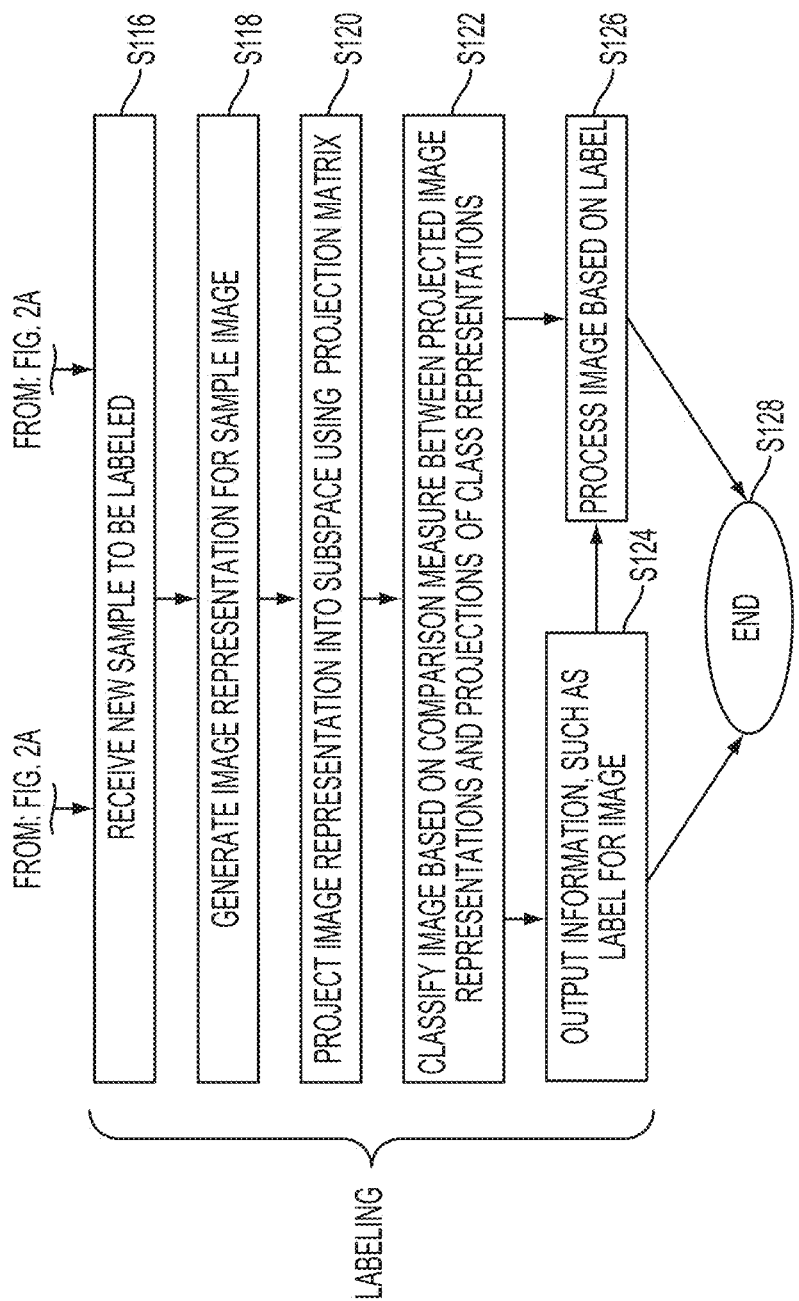

With reference now to FIG. 2, a method for training and using a classifier to label samples 12, such as images, is illustrated. The method may be performed with the system of FIG. 1. The method includes a learning phase, for learning the projection matrix 32, and a retrieval phase, in which the projection matrix is used in sample labeling. The method begins at S100.

At S102, training samples are provided. This includes a set of labeled samples, such as training images 20 and their corresponding class labels. In the exemplary embodiment, a large collection of images of diverse content in multiple classes is provided as the training set, however, more focused collections are also contemplated, such as images of buildings, cars, people, animals, text documents, such as forms or other item of interest.

At S104, multidimensional representations 38 (D-dimensional vectors) are computed for each of the training images 20 (by the representation generator 40), if this has not already been done.

At S106, a class representation 36 is computed (by the training component 30) for each of a set of classes, as a function of the multidimensional representations 38, e.g., by averaging the multidimensional representations 38 of all or at least a subset of the training images 20 labeled with that class. Alternatively, two or more centroids are generated per class by clustering the images using their D dimensional vectors 38. A cluster representation is generated for each cluster as its centroid e.g., by averaging the multidimensional representations 38 assigned to that cluster.

At S108, a projection matrix 32 is learned (by the training component 30), based on the set of training image representations, their corresponding class labels and the computed class representations 36 (or set of class centroids). As described above, a projection matrix is learned which when applied to the sample image representation 12, in an input subspace, embeds the image representation in a new subspace, which enhances the probability that the NCM classifier component 42 will correctly label the sample ((assign it that class the highest probability, according to Eqn. (3), i.e., the class c* with highest probability according to Eqn. 1, is given by Eqn. 3), e.g., based on the Euclidian distance from the labeled sample to the mean of the samples labeled with each class when both are embedded in the new subspace (or based on an aggregation of the Euclidian distance from the labeled sample to each centroid when both are embedded in the new subspace). The learning step may be an iterative process in which the projection matrix is updated, based on whether the labels output by the classifier are correct or not. However, other machine learning methods are also contemplated. The final projection matrix 32 is stored in memory 28. The result of this step is a learned projection matrix 32 for embedding image representations into a subspace in which labeling can be performed by computing a distance to a (nearest) mean class or to two or more centroids representing the class. In some embodiments, the projection matrix W learned for k=1 is used, even when using centroids (k>1) for classification.

The labeled training images 20 used in training may serve as all or part of the database images 16 used to compute the class means (or centroids). In one embodiment, at S110 one or more new images may be added to one or more of the existing classes and respective new class mean(s) (or centroids) computed. As will be appreciated, one or more of the images may be removed from the existing classes at S110. As a result, for at least one of the multidimensional class representations, at least one of the samples in the set of multidimensional representations of labeled samples used in computing the multidimensional class representation is not among the samples labeled with that class which were used in learning the projection. Thus, in general, for any given class, the set of samples used in learning the projection need not be identical to the set of samples used in computing the respective multidimensional class representation (or centroids) for that class. As will be appreciated, computing the new multidimensional class representation for a class to which samples are added need not entail computing the mean representation (or centroids) over all samples in the class but can be performed by aggregating the original mean with a mean representation of the new samples, each mean being weighted to reflect the respective number of samples used in computing it.

In one embodiment, at S112, one or more new classes are added and their respective class mean(s) 36 (or centroids) computed. In this embodiment, for at least one of the classes in the set of classes, no samples labeled with that class were among those used in learning the projection matrix (the samples may have been in the training data, but labeled with other classes, such as more generic class labels). As will be appreciated, one or more of the classes may also be removed from the set of classes at S112. Thus, in general, the set of classes used in learning the projection need not be identical to the set of classes used in the later steps, although in general, at least some of the class labels remain the same.

Optionally, at S114, the class representations 36 (or centroids) for the current set of classes may be embedded into the embedding space using the projection matrix 32 generated at S108, and stored. This involves multiplying each D-dimensional class mean 36 by the projection matrix W to generate an embedded class mean 50 (or embedded centroid) which is a d-dimensional vector. This ends the learning phase, although it is to be appreciated that the method may return to this phase for updating at any time.

At S116, an unlabeled new sample image 12 is received by the system 10. For example, a graphical user interface is generated for display on the display device 66 whereby a user can select an image 12 to be used as the new sample. The new sample 12 may be selected from a collection of images stored on the user's computing device 54 or from a remotely stored collection, such as database 18. In other embodiments, the system 10 automatically accesses a database at intervals to identify unlabeled images or is automatically fed new unlabeled images as they are received. In the exemplary embodiment, the image 12 is not among the images 18 used in training, nor among the images in database 16, although in other embodiments, this situation is not excluded, for example, if the labels of the database images are considered to contain some errors.

At S118, a multidimensional image representation 34 is computed for the input image 12, by the representation generator 40.

At S120, a projected image representation 48 may be computed, by applying the learned projection matrix 32 to the image representation 34, computed at S118.

At S122, the classifier component 42 computes a class or assigns probabilities to the classes for the new sample image 12, based on a computed comparison measure (distances or similarity) between the projected image representation 48 and each of the projected class representations 50. In the case of centroids, the assigning of the class can include computing a probability for each class based on a mixture of exponential decreasing functions of a distance between the embedded multidimensional representation of the new sample 12 and a respective one of the k embedded multidimensional class representations (centroids).

As will be appreciated from the foregoing description, S114, S120, and S122 can be combined into a single classification step in which a classification function such as Eqn. (1) or (3) is jointly applied to the representation 34 and class means 36 (or centroids $m_{cj}$).

At S124, a label for the image 12, or other information, may be output, based on the classifier component output. In some embodiments, a test may be performed to determine whether the computed probability for the most probable class meets or exceeds a predetermined threshold value. If it does not, which indicates that the classifier is not able to identify any class with sufficient certainty, none of the class labels may be assigned to the image and the image may be given a label corresponding to "unknown class." If the computed probability at least meets the threshold, then the most probable class label 14 may be associated with the image 12. The label may be output from the system and linked to the image in some manner, such as with a tag, or stored in a record in which images are indexed by their labels. In some embodiments, the image 12 and its label 14 may be sent to the client device for validation by a person.

In some embodiments, the image and its label (optionally after human validation) may be added to the database 18. In some embodiments, the method may return to S110 where a new class mean $\mu_c$ (or set of class means, i.e., centroids) may be computed, to reflect the newly added member 12 of the class corresponding to the label 14.

In some embodiments, at S126, a process may be implemented automatically, based on the assigned label. For example, if one or or more of the classes relate to people of interest, and the label 14 is for a person who is of interest, the image 12 may be forwarded to the client device 54, where a user may view the image on an associated display 66 to confirm that the person has been correctly identified, and/or an automated process implemented, depending on the application. For example, the method may be used in airport screening, in identifying company individuals or named guests photographed, for example, at an event, in identifying the names of "friends" on a social media website, or the like. In another embodiment, if the image 12 contains alphanumeric characters, such as a form, scanned mail item, license plate image, or the like, the sample image 12 may be sent by the processing component 46 to an appropriate business unit designated for dealing with the type of text item corresponding to the class, and/or may be further processed, such as with OCR, or the like.

The method ends at S128.

The method illustrated in FIG. 2 may be implemented in a non-transitory computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the retrieval method.

Further illustrative examples of aspects of the system and method will now be described.

The images 12, 16, 20 may be received by the system 10 in any convenient file format, such as JPEG, GIF, JBIG, BMP, TIFF, or the like or other common file format used for images and which may optionally be converted to another suitable format prior to processing. Input images may be stored in data memory during processing. The image 12 can be input from any suitable image source 54, such as a workstation, database, memory storage device, such as a disk, or the like. The images 12, 16, 20 may be individual images, such as photographs, scanned images, video images, or combined images which include photographs along with text, and/or graphics, or the like. In general, each input digital image includes image data for an array of pixels forming the image. The image data may include colorant values, such as grayscale values, for each of a set of color separations, such as L*a*b* or RGB, or be expressed in another other color space in which different colors can be represented. In general, "grayscale" refers to the optical density value of any single color channel, however expressed (L*a*b*, RGB, YCbCr, etc.). The word "color" is used to refer to any aspect of color which may be specified, including, but not limited to, absolute color values, such as hue, chroma, and lightness, and relative color values, such as differences in hue, chroma, and lightness.

Each of the training images 20 and database images 16 is labeled with one (or more) class labels selected from a predetermined set of class labels, which may have been manually applied to the training images, or, in some embodiments, some of the labels may have been automatically applied, e.g., using trained classifiers, such as one for each class. To improve performance, each training image 20 generally has only a single label. The label may be in the form of a tag, such as an XML tag, or stored in a separate file. Each label corresponds to a respective class from a finite set of classes. There may be a large number of classes such as at least 20, or at least 50, or at least 100, or at least 1000 classes, and up to 10,000 or more classes, depending on the application and the availability of training data. The same number or a modified set of classes may be used in the classification (labeling) stage. For each class, there is a set of images labeled with that class. For example, there may be at least 5, or at least 10, or at least 100, or at least 1000 training images for each class. Each class representation is thus generated from at least 5, or at least 10, or at least 100, or at least 1000 labeled images. There is no need for each class to include the same number of images, although in training it may be helpful. The same number of labeled images or a modified set of may be used in the generation of the class representations used for classification. The class labels for training may be selected according to the particular application of interest. For example, if the aim is to find images of specific buildings, there may be class labels for different types of buildings, such as monuments, towers, houses, civic buildings, bridges, office buildings, and the like.

The projection 32 can be used over all classes, both existing and new ones. In general the projection 32 comprises a matrix or objective function which, when applied to an original image representation 34 and class representations 36 (or set of centroids $m_{cj}$), each in the form of a multidimensional vector, converts the respective representation to a new "embedded" representation in a new multidimensional space which is a multidimensional vector of typically fewer dimensions than that of the input representation, a process referred to herein as embedding. In general, the projection can be a matrix and the embedding is the result of multiplying the respective vector 34, 36 by the matrix 32.

When applied to representations 34, 36, the projection 32 generates embedded representations 48, 50 for which a suitable distance measure, which is the same distance measure as is used in learning the projection, is a statistically better predictor of the correct class of the image 12, when used by the NCM classifier component 42, than is achieved with the original representations 34, 36.

The exemplary system 10 provides improvements over a system in which a conventional NCM classifier is used.

The representation generator 40 may be any suitable component for generating an image representation (or "signature") 34, 38, such as a multidimensional vector, for the images 12, 16, 20, if their signatures have not been precomputed. Product quantization (PQ) or other dimensionality reduction technique, such as Principal Component Analysis, may be employed to reduce the dimensionality of the image representations, prior to projection. This reduces the storage space needed for the representations. Product quantization (PQ) can be used, for example, as a lossy compression mechanism for local SIFT descriptors in a bag-of-features image retrieval system or to compress bag-of-word and Fisher vector image representations. For a further description of the compression method, see, Jégou, H., Perronnin, F., Douze, M., Sánchez, J., Pérez, P., Schmid, C., "Aggregating Local Images Descriptors into Compact Codes, IEEE Trans Pattern Anal Mach Intel!. Dec. 7, 2011; Perronnin, F., Sánchez, J., Liu, Y., "Large-scale image categorization with explicit data embedding," in: CVPR. (2010); Lin, Y., Lv, F., Zhu, S., Yang, M., Cour, T., Yu, K., Cao, L., Huang, T., "Large-scale image classification," in CVPR (2011); Sánchez, J., Perronnin, F., "High-dimensional signature compression for large-scale image classification, in CVPR (2011). The same compression technique is generally used for all the images.

As with conventional NCM classifiers, each class in a set of classes is represented by a class representation, such as its mean feature vector, i.e., the mean of all the feature vectors of the images in the database that are labeled with that class (see, Webb, A., "Statistical Pattern Recognition", Wiley (2002); Veenman, C., et al. "LESS: a model-based classifier for sparse subspaces. IEEE Trans. PAMI 27, pp. 1496-1500 (2005); and Zhou, X., et al., "Sift-bag kernel for video event analysis," in ACM Multimedia (2008)). However, in the present system and method, the class is represented by a projected class representation, where the projection has been learned as described above. When a new image is to be labeled, its own representative feature vector is compared with the mean feature vectors of each of the classes using a suitable distance measure, but in the present case, the feature vectors are both projected using the projection matrix. The label or labels assigned to the image are based on the computed distances. The cost of computing the mean for each class is low, with respect to the cost of feature extraction, and this operation does not require accessing images of other classes.

Computing Image Representations (S104, S118)

Various methods are available for computing image signatures. In general, the representation generator 40 generates a statistical representation 34, 38 of low level features extracted from the respective image, such as visual features or, in the case of text samples, features based on word frequencies can be employed.

Exemplary methods for generating image representations (image signatures) are described, for example, in U.S. Pub. Nos. 20030021481; 2007005356; 20070258648; 20080069456; 20080240572; 20080317358; 20090144033; 20100040285; 20100092084; 20100098343; 20100226564; 20100191743; 20100189354; 20100318477; 20110040711; 20110026831; 20110052063; 20110091105; 20120045134; and 20120076401, the disclosures of which are incorporated herein by reference in their entireties.

For example, the image representation generated by the representation generator for each image 12, 16, 20 can be any suitable high level statistical representation of the image, such as a multidimensional vector generated based on features extracted from the image. Fisher Kernel representations and Bag-of-Visual-Word representations are exemplary of suitable high-level statistical representations which can be used herein as an image representation.

For example, the representation generator 40 includes a patch extractor, which extracts and analyzes low level visual features of patches of the image, such as shape, texture, or color features, or the like. The patches can be obtained by image segmentation, by applying specific interest point detectors, by considering a regular grid, or simply by the random sampling of image patches. In the exemplary embodiment, the patches are extracted on a regular grid, optionally at multiple scales, over the entire image, or at least a part or a majority of the image.

The extracted low level features (in the form of a local descriptor, such as a vector or histogram) from each patch can be concatenated and optionally reduced in dimensionality, to form a features vector which serves as the global image signature. In other approaches, the local descriptors of the patches of an image are assigned to clusters. For example, a visual vocabulary is previously obtained by clustering local descriptors extracted from training images, using for instance K-means clustering analysis. Each patch vector is then assigned to a nearest cluster and a histogram of the assignments can be generated. In other approaches, a probabilistic framework is employed. For example, it is assumed that there exists an underlying generative model, such as a Gaussian Mixture Model (GMM), from which all the local descriptors are emitted. Each patch can thus be characterized by a vector of weights, one weight for each of the Gaussian functions forming the mixture model. In this case, the visual vocabulary can be estimated using the Expectation-Maximization (EM) algorithm. In either case, each visual word in the vocabulary corresponds to a grouping of typical low-level features. The visual words may each correspond (approximately) to a mid-level image feature such as a type of visual (rather than digital) object (e.g., ball or sphere, rod or shaft, flower, autumn leaves, etc.), characteristic background (e.g., starlit sky, blue sky, grass field, snow, beach, etc.), or the like. Given an image 12, 16, 20 to be assigned a representation 34, 38, each extracted local descriptor is assigned to its closest visual word in the previously trained vocabulary or to all visual words in a probabilistic manner in the case of a stochastic model. A histogram is computed by accumulating the occurrences of each visual word. The histogram can serve as the image representation 34, 38 or input to a generative model which outputs an image representation based thereon.

As local descriptors extracted from the patches, SIFT descriptors or other gradient-based feature descriptors, can be used. See, e.g., Lowe, "Distinctive image features from scale-invariant keypoints," IJCV vol. 60 (2004). In one illustrative example employing SIFT features, the features are extracted from 32×32 pixel patches on regular grids (every 16 pixels) at five scales, using 128-dimensional SIFT descriptors. Other suitable local descriptors which can be extracted include simple 96-dimensional color features in which a patch is subdivided into 4×4 sub-regions and in each sub-region the mean and standard deviation are computed for the three channels (R, G and B). These are merely illustrative examples, and additional and/or other features can be used. The number of features in each local descriptor is optionally reduced, e.g., to 64 dimensions, using Principal Component Analysis (PCA). Signatures can be computed for two or more regions of the image and aggregated, e.g., concatenated.

In some illustrative examples, a Fisher vector is computed for the image by modeling the extracted local descriptors of the image using a mixture model to generate a corresponding image vector having vector elements that are indicative of parameters of mixture model components of the mixture model representing the extracted local descriptors of the image. The exemplary mixture model is a Gaussian mixture model (GMM) comprising a set of Gaussian functions (Gaussians) to which weights are assigned in the parameter training. Each Gaussian is represented by its mean vector, and covariance matrix. It can be assumed that the covariance matrices are diagonal. See, e.g., Perronnin, et al., "Fisher kernels on visual vocabularies for image categorization" in CVPR (2007). Methods for computing Fisher vectors are more fully described in U.S. Pub No. 20120076401, published Mar. 29, 2012, entitled IMAGE CLASSIFICATION EMPLOYING IMAGE VECTORS COMPRESSED USING VECTOR QUANTIZATION, by Jorge Sánchez, et al., and 20120045134, published Feb. 23, 2012, entitled LARGE SCALE IMAGE CLASSIFICATION, by Florent Perronnin, et al., and in Florent Perronnin, Jorge Sánchez, and Thomas Mensink, "Improving the fisher kernel for large-scale image classification," in *Proc. 11th European Conference on Computer Vision* (ECCV): *Part IV*, pages 143-156 (2010), and in Jorge Sánchez and Florent Perronnin, "High-dimensional signature compression for large-scale image classification," in CVPR 2011, the disclosures of which are incorporated herein by reference in their entireties. The trained GMM is intended to describe the content of any image within a range of interest (for example, any color photograph if the range of interest is color photographs).

In other illustrative examples, a Bag-of-Visual-word (BOV) representation of an image is used as the original image representation 34, 38. In this case, the image is described by a histogram of quantized local features. (See, for example, U.S. Pub. No. 20080069456, the disclosure of which is incorporated herein by reference in its entirety). More precisely, given an (unordered) set of the local descriptors, such as set of SIFT descriptors or color descriptors extracted from a training or test image, a BOV histogram is computed for the image or regions of the image. These region-level representations can then be concatenated or otherwise aggregated to form an image representation (e.g., one for SIFT features and one for color features). The SIFT and color image representations can be aggregated to form the image signature.

Apart from being useful in settings where labeled images arrive online (where classifiers can be updated and added instantaneously), the method is advantageous when for some classes, no high-quality ground-truth labels are available, user tags for which no curated set of positive images has been established. For such labels the class mean can be computed from a noisy set of positive images, and rely on strong metrics learned from a training set that is not influenced by noisy labels.

The method also finds application in query-by-example image retrieval, which can be seen as a classification problem where a single positive sample is provided. In such a case, the class mean simplifies to the query which shows that the proposed NCM provides a unified way to treat classification and retrieval problems.

Without intending to limit the scope of the exemplary embodiment, the following examples demonstrate the application of the method to image classification.

EXAMPLES

Results obtained for an NCM classifier are compared with those obtained with other methods. In particular, a k-NN classifier was used which also employed a metric learning approach (see the description below of this method). Results were also obtained for transfer learning where the metrics (projections) trained on some classes were applied to novel ones. Performance is assessed as a function of the number of training images. As a baseline comparison, one-vs-rest linear SVM classifiers were learned independently for each class.

Dataset

In most of the experiments, the dataset of the ImageNet Large Scale Visual Recognition 2010 challenge (ILSVRC'10) was used. This dataset contains 1.2 million training images of 1,000 object classes (with between 660 to 3,047 images per class), an evaluation set of 50,000 images, and a test set of 150,000 images.

Features

Each image was represented with a Fisher vector (FV) computed over densely extracted SIFT descriptors and local color features, both projected with PCA to 64 dimensions. FVs were extracted and normalized separately for both channels and then combined by concatenating the two feature vectors. In the experiments FVs were extracted using a vocabulary of either 16 or 256 Gaussians. For 16 Gaussians, this leads to a 4K dimensional feature vector, which requires about 20 GB for the 1.2M image training set (using 4-byte floating point arithmetic). This fits into the RAM of a single 32 GB server. For 256 Gaussians, the FVs are 16 times larger, 64K dimensional, which would require 320 GB of memory. Hence, the feature vectors are compressed using product quantization. This entailed splitting the high-dimensional vector into small sub-vectors, and vector quantizing each sub-vector independently. In this way, the dataset is compressed to approximately 10 GB using 8-dimensional sub-vectors and 256 centroids per sub-quantizer, which allows storing each sub-quantizer index in a single byte.

NCM Learning Method

For evaluating the exemplary NCM classifier, the metric learning algorithm based on multi-class logistic discrimination was used, as described above. Stochastic gradient descent was used, which accesses only a small fraction of the training data at each iteration. In each iteration of SGD learning of the projection matrix, the features of a limited number of images (e.g., 1000) are decompressed and these (lossy) reconstructions are used for the gradient computation. A sample from a given class is enforced to be closer to its class mean than to any other class mean in the projected space.

k-NN Learning Method

Learning for the k-NN classifier was similar to that for the NCM classifier in that the Mahalanobis distances of the form $(x-x')^T W^T W(x-x')$ were learned to improve classification accuracy. K-NN classification used the metric learning approach of Large Margin Nearest Neighbor (LMNN) classification. See Weinberger, et al., "Distance metric learning for large margin nearest neighbor classification," in NIPS (2006). The k-NN method also employed a projection matrix W, learned in a similar manner to the NCM classifier, but here each labeled image was separately projected with the projection matrix, rather than a class mean. The $l_2$ distance, after projection, was used to identify the k-NN for a sample image, with k=100-250 being optimal, and the classes of these images were used to compute a class for the sample image.

Baseline Approach

For the baseline, 1,000 one-vs-rest SVM classifiers were learned with SGD, as described in Sánchez, J., Perronnin, F., "High-dimensional signature compression for large-scale image classification," in CVPR (2011). The 64K dimensional features lead to significantly better results than the 4K ones, despite the lossy PQ compression.

Experiments

When using the same set of classes for training and testing, it was found that the NCM classifier outperformed the k-NN classifier. Moreover, the NCM classifier performs on a par with the SVM baseline method. Even when the data is projected to as little as 256 dimensions, the NCM performance is comparable to that of the linear SVMs.

The experiments also considered the generalization performance to new classes. In a first experiment, the projection matrix was trained on a subset of classes of ILSVRC'10. These and the held-out classes were used at test time. Only a small drop in performance was observed, compared to the experiment where the metric is learned with all classes. In a second experiment, the projection matrix was trained on ILSVRC'10 and applied to a larger set of 10,000 ImageNet classes. Once the metric is learned, the 10,000 classifiers (class means) could be learned on 64K (65,536) dimensional features in less than an hour on a single CPU, while learning one-vs-rest linear SVMs on the same data for the baseline method takes on the order of 280 CPU days.

Further, a zero-shot setting was investigated where the class mean of novel classes was estimated based on related classes in the ImageNet hierarchy. The zero-shot class mean can be effectively combined with the empirical mean of a small number of training images. This provides an approach that smoothly transitions from settings without training data to ones with abundant training data.

Evaluation Measures

As a performance measure, the average top-1 and top-5 flat error used in the ILSVRC'10 challenge was used. The flat error equals one if the ground-truth label does not correspond to the top-1 label with highest score, in the case of top-1 flat error, or any of the top-5 labels in the case of top-5 flat error, and is zero otherwise. Thus a lower average flat error is indicative of better performance. The validation set of the ILSVRC'10 challenge was used for parameter tuning only.

Results

1. Classification Using Classes Used in Training

Tables 1 and 2 compare the performance of k-NN and NCM classifiers, as well as baseline SVM, using the 4K and compressed 64K dimensional features, respectively for various projection dimensions d (no projection in the case of SVM). A nearest class mean classifier system without the learned projection matrix (NCM baseline) was also evaluated. This method used PCA compression and then $l_2$ distances.

TABLE 1

| 4K dimensional features, average top-5 flat error | | | | | | |
|---|---|---|---|---|---|---|
| | Projection dim. d | | | | | |
| | 32 | 64 | 128 | 256 | 512 | 1024 | Full |
| SVM baseline | | | | | | | 38.2 |
| k-NN | 47.2 | 42.2 | 39.7 | 39.0 | 39.4 | 43.2 | |
| NCM baseline | 78.7 | 74.6 | 71.7 | 69.9 | 68.8 | 68.2 | 68.0 |
| NCM, with learned projection matrix | 49.1 | 42.7 | 39.0 | 37.4 | 37.0 | 37.0 | |

TABLE 2

| 64K dimensional features, average top-5 flat error | | | | |
|---|---|---|---|---|
| Projection dim. D | 128 | 256 | 512 | Full |
| SVM baseline | | | | 28.0 |
| k-NN | | | | |
| NCM baseline | | | | 63.2 |
| NCM, with learned projection matrix | 31.7 | 31.0 | 30.7 | |

For the 4K dimensional features, the NCM classifier (error 37.0) outperforms the k-NN classifier (error 39.8), and even slightly outperforms the SVM baseline (error 38.2), when projecting to 256 dimensions or more. Using the $l_2$ (NCM baseline) instead of a learned metric gives worse performance than the other methods. Other methods were also compared, which are not reported in these tables. These included ridge regression and the method described in Weston, J., Bengio, S., Usunier, N., "WSABIE: Scaling up to large vocabulary image annotation," in: IJCAI (2011), which did not perform as well as the exemplary method.

When the 64K dimensional features were used, the results of the NCM classifier with learned projection matrix (30.8)

are somewhat worse than the SVM baseline (28.0), yet still very good in comparison with other methods.

2. Generalization to New Classes and Using Few Samples

The ability to generalize to novel classes was investigated for the exemplary NCM classifier method and compared with the SVM baseline and the k-NN methods (it may be noted that the SVM baseline method does not generalize to new classes, in fact an SVM classifier is learned for each class, giving it an advantage over the NCM and kNN methods, although at greater cost). Its performance was measured as a function of the number of training images available to estimate the mean class representation of novel classes.

In this experiment, approximately 1M images corresponding to 800 random classes were used to learn metrics, and the error of a 1,000-way classification was evaluated across all classes. The error was computed over the 30K images in the test set of the held-out 200 classes. Performance among test images of the 800 training classes changes only marginally and would obscure the changes among the test images of the 200 held-out classes.

Table 3 shows the performance of 1,000-way classification among test images of the 200 classes that were not used for projection learning, and control setting with metric learning using all classes.

TABLE 3

Generalization to New Classes, average top-5 flat error

| | 4K dimensional features | | | | | | | 64K dim. features | | | |
|---|---|---|---|---|---|---|---|---|---|---|---|
| | SVM | k-NN | | NCM | | | | SVM | NCM | | |
| | | | | Projection dim. d | | | | | | | |
| | Full | 128 | 256 | 128 | 256 | 512 | 1024 | Full | 128 | 256 | 512 |
| Trained on all | 37.6 | 39.0 | 38.4 | 38.6 | 36.8 | 36.4 | 36.5 | 27.7 | 31.7 | 30.8 | 30.6 |
| Trained on 800 | | 42.4 | 42.8 | 42.5 | 40.4 | 39.9 | 39.6 | | 39.3 | 37.8 | 38.0 |

The results show that the k-NN and NCM classifiers generalize well to new classes. In particular for 1024 dimensional projections of the 4K features, the NCM classifier achieves an error of 39.6 over classes not seen during training, as compared to 36.5 when using all classes for training. For the 64K dimensional features, the drop in performance is larger, but it is still good considering that training for the novel classes consists only in computing the mean.

To further demonstrate the generalization ability of the NCM classifier using learned metrics, it was compared against the SVM baseline on the ImageNet –10K dataset. This dataset consists of 4.5M training images in 10,184 classes, and a test set of another 4.5M images. The projection matrix for the NCM classifier was learned on the ILSVRC'10 dataset, and the class means of the new 10K classes were computed. The results show that even in this extremely challenging setting, the NCM classifier performs remarkably well compared to the SVM baseline, which requires training 10K classifiers. Training the SVM baseline system took 9 and 280 CPU days respectively for the 4K and 64K features, while the computation of the means for the NCM classifier took approximately 3 and 48 CPU minutes respectively. This represents a roughly 8,500 fold speed-up as compared to the baseline, without counting the time to learn the projection matrix.

Table 4 illustrates the performance of the NCM classifier on the ImageNet-10K dataset, using metrics learned on the ILSVRC'10 dataset.

TABLE 4

Comparison between NCM and SVM Classifiers

| | 4K dimensional features | | | | | 64K dimensional features | | | |
|---|---|---|---|---|---|---|---|---|---|
| | | | | | Classifier | | | | |
| | NCM | | | SVM | | NCM | | | SVM |
| | | | | Projection dim. | | | | | |
| | 128 | 256 | 512 | 1024 | Full | 128 | 256 | 512 | Full |
| Flat top-1 error | 91.8 | 90.6 | 90.5 | 90.4 | 86.0 | 87.1 | 86.3 | 86.1 | 78.1 |
| Flat top-5 error | 80.7 | 78.7 | 78.6 | 78.6 | 72.4 | 71.7 | 70.5 | 70.1 | 60.9 |

By way of comparison, it has been reported that other classifiers achieve a flat top-1 error of 93.6 and 83.3 on this type of task, but using 21K and 131K features, respectively.

3. Accuracy as a Function of the Number of Training Images of Novel Classes

In this experiment the error was considered as a function of the number of images that are used to compute the means of novel classes. Results of a zero-shot learning experiment are also included, where the ImageNet hierarchy was used to estimate the mean of novel classes from the means of related training classes. Specifically, the mean of a novel class was estimated as the average of the means associated with all ancestor nodes in the ILSVRC'10 class hierarchy. The means of internal nodes are computed as the average of the means of all descendant training classes. Viewing the estimation of a class mean as the estimation of the mean of a Gaussian distribution, then the sample average $\mu_s$ corresponds to the Maximum Likelihood (ML) estimate and the zero-shot estimate $\mu_z$ can be thought of as a prior. This prior can be combined with the ML estimate to obtain a maximum a-posteriori (MAP) estimate $\mu_p$ on the class mean. The MAP estimate of the mean of a Gaussian is obtained as the ML estimate weighted by the number n of images that were used to compute it, plus the prior mean which has a weight m determined on the validation set, $\mu_p = (n\mu_s + m\mu_z)/(n+m)$.

Figure 3:
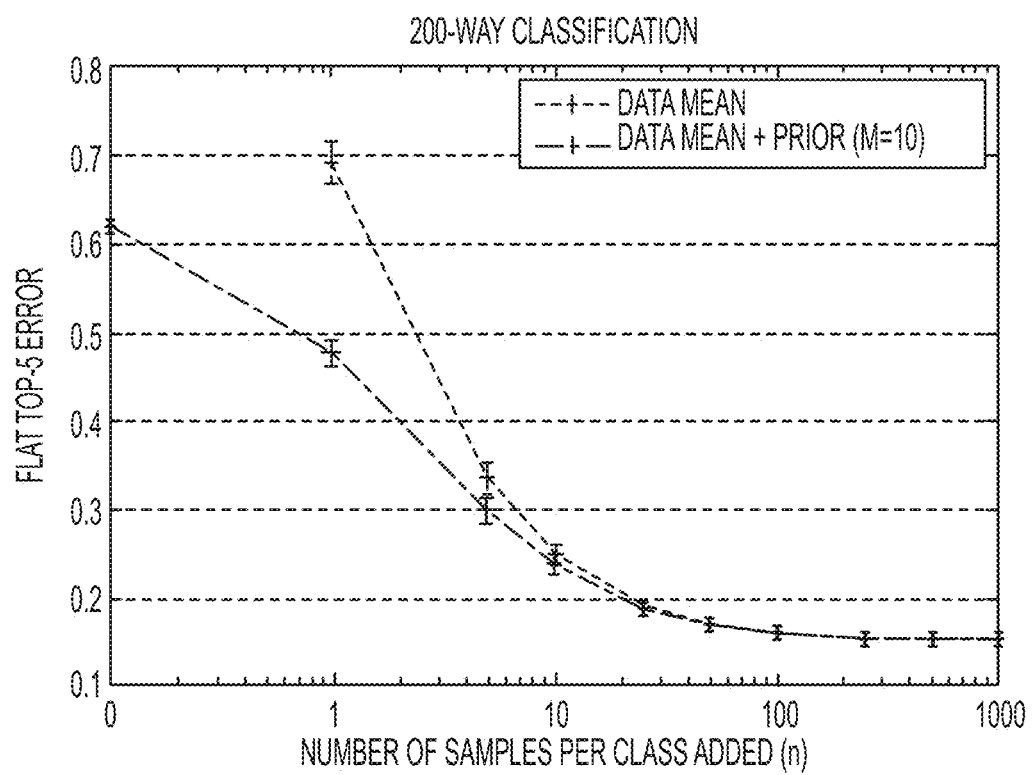
FIG. 3 is a plot which illustrates the influence of a small number of samples added to a zero-shot setting for 200 class classification with a nearest class mean (NCM) classifier, with and without aggregating the zero-shot classifier with a prior.
Figure 4:
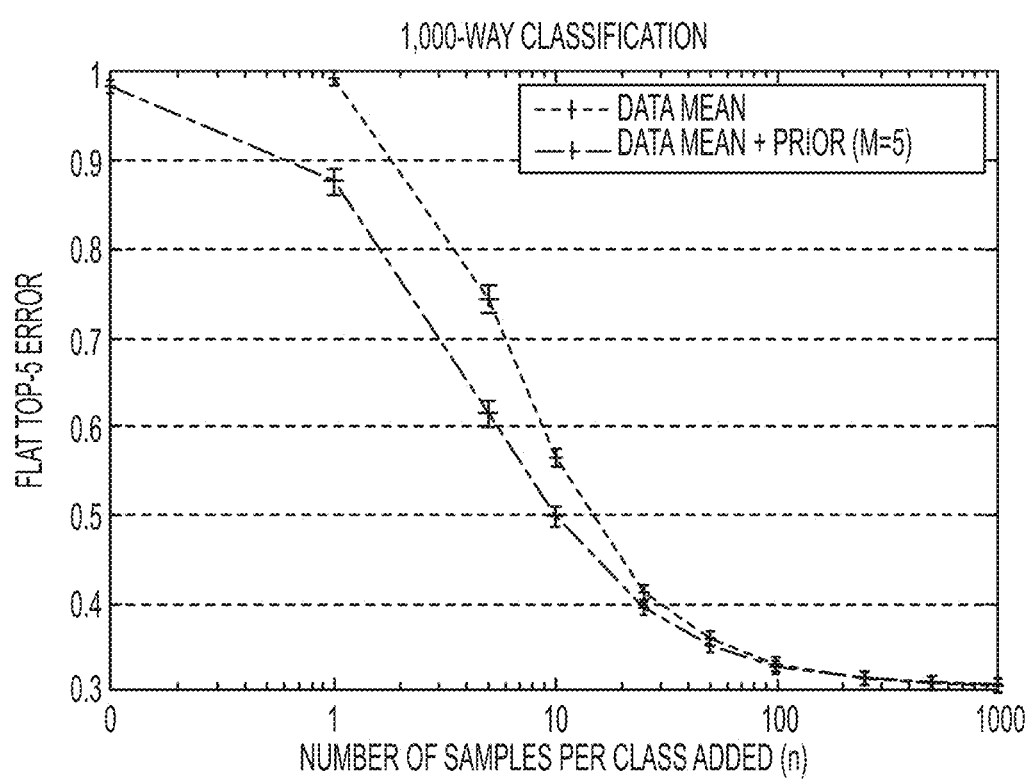
FIG. 4 is a plot which illustrates the influence of a small number of samples added to the zero-shot setting for 1000 class classification, with and without aggregating the zero-shot classifier with a prior.

In this experiment, the performance of the NCM classifier trained on the images of the same 800 classes used above, with a learned projection from 64K to 512 dimensions was evaluated. The error is again reported among test images of the held-out classes in a 200-way classification setting. The experiment was repeated 10 times. FIGS. 3 and 4 show performance of NCM as a function of the number of images used to compute the means for classes not used during training, with and without the zero-shot prior. Error-bars are shown at three times standard deviation. For the error to stabilize, only approximately 100 images are needed to estimate the class means. The results also show that the prior leads to a zero-shot performance of 61.8, which is comparable to the result of 65.2 reported in Rohrbach, et al., "Evaluating knowledge transfer and zero-shot learning in a large-scale setting," in CVPR (2011), even though they used a different set of 200 test classes. The results show that the zero-shot prior can be effectively combined with the empirical mean to provide a smooth transition from the zero-shot setting to a setting with many training examples. Inclusion of the zero-shot prior leads to a significant error reduction in the regime where ten images or less are available.

The results shown herein demonstrate that the exemplary NCM classifiers can be applied on large scale dynamic and open-ended image datasets, and allow extensions at (near) zero cost to new classes not used for training. Using the learned metric, the performance of the NCM classifier is comparable to that of SVM classifiers, while projecting the data to only 256 dimensions. The learned metrics generalize well to unseen classes, as shown in experiments where the metric is learned on a subset of the classes, and further corroborated by experiments on the ImageNet-10K dataset. In addition, the results show that the NCM classifiers can be used in a zero-shot setting where no training images are available for novel classes, and that the zero-shot model significantly boosts performance when combined with a class mean estimated from a limited number of training images.

Non-linear Classification Using Multiple Class Centroids

Figure 5:
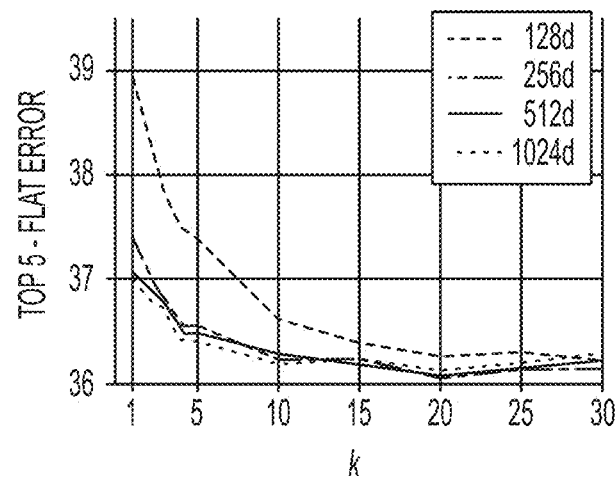
FIG. 5 shows the top-5 performance of a nearest class multiple centroids (NCMC) classifier using different values for the number k of centroids, using a projection learned when k=1 for 4K (4,096)-dimensional image feature vectors.
Figure 6:
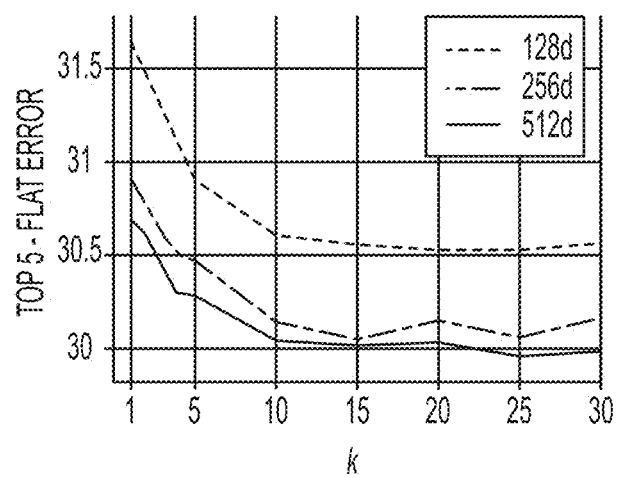
FIG. 6 shows the top-5 performance of a NCMC classifier using different values for the number k of centroids, using a projection learned when k=1 for 64K (65,536)-dimensional image feature vectors.

In these experiments, the nonlinear NCMC classifier was used, where each class is represented by a set of k centroids. The k centroids per class were obtained by using the k-means algorithm in the L2 space. Since the cost of training these classifiers is much higher, two sets of experiments were performed. In FIGS. 5 and 6, the performance of the NCMC classifier at test time with k=[2; : : : ; 30], while using a metric W obtained by the NCM objective (k=1), this method is denoted as NCMC-test. For each value of k, the early stopping strategy is used to determine the best metric. FIG. 5 shows the results when D=4,096 and FIG. 6 when D=65,536.

In Table 5, the performance of the NCMC classifier, trained with the NCMC objective function, using the 4K features is shown. In the same table, the results are compared to the NCM method and the best NCMC-test method.

TABLE 5

Top-5 performance of the NCMC classifier using the 4K features, compared to the NCM method and the best NCMC classifier (with the value of k in brackets)

| Proj. Dim. D. | NCM | NCMC (k) | NCMC (k - 5) | NCMC (k - 10) | NCMC (k - 15) |
| --- | --- | --- | --- | --- | --- |
| 128 | 39.0 | 36.3 (30) | 36.2 | 35.8 | 36.1 |
| 256 | 37.4 | 36.1 (20) | 35.0 | 34.8 | 35.3 |
| 512 | 37.0 | 36.2 (20) | 34.8 | 34.6 | 35.1 |

From the results it can be observe that a significant performance improvement can be made by using the non-linear NCMC classifier, especially when using a low number of projection dimensionalities. For example, when the 4K features with 128 projection dimensions is used, an improvement of 3:2 absolute points is achieved by training using the NCMC objective function over the NCM objective. For the other projection dimensions, using the NCMC classifier yields a moderate improvement of about 1 absolute point. Apparently, in this setting the non-linear classification with higher projection dimensionalities, adds less to the discriminant power of the linear NCM classifier. This indicates that when learning using the NCMC classifier a further improvement in the performance of the nonlinear classification can be achieved, albeit for a higher training cost. When using as little as 512 projection dimensions, a very impressive performance of 34:6 on the top-5 error is achieved using k=10 centroids. That is an improvement of about 2:4 absolute points over the NCM classifier (37.0), and 3:6 absolute points over SVM classification (38.2).

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A classification method comprising:
with a processor, for a new sample to be classified, for each of a set of classes, computing a probability for each class based on a comparison measure between a multidimensional representation of the new sample and a respective multidimensional class representation, the comparison measure being computed in a space of lower dimensionality than the multidimensional representation of the new sample by embedding the multidimensional representation of the new sample and the multidimensional class representations with a projection that has been learned on labeled samples to optimize classification of the labeled samples based on the comparison measure, the comparison measure being based on an exponentially decreasing function of a distance between the embedded multidimensional representation of the sample and a respective one of the embedded multidimensional class representations, each multidimensional class representation being computed based on a set of multidimensional representations of labeled samples that are labeled with the respective class; and assigning a class to the new sample based on the computed probabilities.

2. The method of claim 1, wherein the projection is one which optimizes an objective function which maximizes, over the labeled samples, a likelihood that a labeled sample will be classified with a correct label, the correct label having been assigned to the labeled sample from a finite set of labels for the labeled samples.

3. The method of claim 1, further comprising learning the projection.

4. The method of claim 3, wherein the learning of the projection aims to minimize the negative log-likelihood of the class labels $y_i \in \{1, \ldots, C\}$ of the training samples according to the objective function:

$$\mathcal{L} = -\frac{1}{N}\sum_{i=1}^{N} \ln p(y_i \mid x_i) \tag{4}$$

where N is the number of labeled samples, and
($p(y_i|x_i)$) is the probability of observing the correct label $y_i$ for a labeled sample $X_i$.

5. The method of claim 4, wherein the learning of the projection includes optimizing the objective function with stochastic gradient descent.

6. The method of claim 3, wherein the learning of the projection includes learning a subspace in which each labeled sample is closer in the subspace to its multidimensional class representation than to multidimensional class representations of other classes.

7. The method of claim 1, wherein the multidimensional representation of the new sample comprises a statistical representation of features extracted from the new sample.

8. The method of claim 7, wherein the multidimensional representation of the new sample comprises at least one of a Fisher Vector and a Bag-of-Visual-words representation.

9. The method of claim 1, wherein the assigning a class comprises computing a probability for each class based on an exponential decreasing function of a distance between the embedded multidimensional representation of the new sample and a respective embedded multidimensional class representation.

10. The method of claim 1, wherein each comparison measure comprises a distance measure.

11. The method of claim 10, wherein the assigning of the class comprises assigning a class for which the distance is a minimum.

12. The method of claim 10, wherein the computing the comparison measure comprises computing the $l_2$ distance.

13. The method of claim 1, wherein each multidimensional class representation is a mean of multidimensional representations of the labeled samples labeled with the respective class.

14. The method of claim 1, wherein each multidimensional class representation comprises a set of cluster centers obtained from the multidimensional representations of the samples labeled with the respective class.

15. The method of claim 14, wherein the assigning of a class comprises computing a probability for each class based on a mixture of exponentially decreasing functions of a distance between the embedded multidimensional representation of the new sample and a respective one of the embedded multidimensional class representations.

16. The method of claim 1, wherein the projection is a D×d dimensional matrix, where D represents a number of the dimensions in the multidimensional representation and multidimensional class representations and d represents a number of the dimensions in the embedded multidimensional representation and embedded multidimensional class representations.

17. The method of claim 16, wherein d≤0.5 D.

18. The method of claim 1, wherein for at least one of the multidimensional class representations, the set of samples used in computing the multidimensional class representation is not identical to the set of the samples labeled with that class which were used in learning the projection.

19. The method of claim 1, wherein for at least one of the classes in the set of classes, no samples labeled with that class are used in learning the projection.

20. The method of claim 1, wherein the new sample and the labeled samples each comprises an image.

21. A computer program product comprising a non-transitory recoding medium storing instructions which when executed by a computer, perform the method of claim 1.

22. A system comprising memory which stores instructions for performing the method of claim 1 and a processor in communication with the memory which implements the instructions.

23. A system comprising:
memory which stores:
a projection matrix for embedding multidimensional representations into an embedding space, the projection matrix having been learned from class-labeled samples to optimize a classification rate on the labeled samples with nearest class mean classifiers; and
a nearest class mean classifier for each of a set of classes, each of the nearest class mean classifiers in the set being computed based on multidimensional representations of samples that are labeled with the respective class;
instructions for:
computing a comparison measure between a multidimensional representation of a new sample and each of the nearest class mean classifiers, the comparison measure being computed in the embedding space in which the multidimensional representation of the new sample and the nearest class mean classifiers are embedded with the projection matrix, the comparison measure being based on an exponentially decreasing function of a distance between the embedded multidimensional representation of the new sample and a respective one of the embedded multidimensional class representations, and
outputting information based on the comparison measure; and
a processor in communication with the memory which implements the instructions.

24. The system of claim 23, further comprising a database which stores a set of the labeled samples.

25. The system of claim 23, wherein the outputting information comprises a class for the new sample corresponding to the nearest class mean classifier that the comparison measure indicates is closest to the new sample.

26. A method of generating a classification system, comprising:
providing a multidimensional representation and a class label for each of a set of training samples, each of the class labels corresponding to a respective one of a set of classes;
computing a nearest class mean classifier for each of the classes, based on the multidimensional representations of training samples labeled with that class;
with a processor, learning a projection based on the multidimensional representations, class labels, and nearest class mean classifiers which embeds the multidimensional representations and nearest class mean classifiers into an embedding space that optimizes a classification of the training samples by the set of nearest class mean classifiers in the embedding space, the learning of the projection aims to minimize the negative log-likelihood of the class labels $y_i \in \{1, \ldots, C\}$ of the training samples according to the objective function:

$$\mathcal{L} = -\frac{1}{N}\sum_{i=1}^{N} \ln p(y_i \mid x_i) \qquad (4)$$

where N is the number of labeled samples, and
$p(y_i|x_i)$ is the probability of observing the correct label $y_i$ for a labeled sample $X_i$; and
storing the projection for embedding a new sample into the embedding space.

27. The method of claim 26, wherein the projection comprises a D×d matrix, where d is a number of dimensions in the embedding space and D is a number of dimensions in each of the nearest class mean classifiers and where D is greater than d.

* * * * *